United States Patent
Peterson et al.

(10) Patent No.: US 10,827,320 B2
(45) Date of Patent: Nov. 3, 2020

(54) PRESENTATION OF INFORMATION BASED ON WHETHER USER IS IN PHYSICAL CONTACT WITH DEVICE

(71) Applicant: Lenovo (Singapore) Pte. Ltd., New Tech Park (SG)

(72) Inventors: Nathan J. Peterson, Oxford, NC (US); Arnold S. Weksier, Raleigh, NC (US); John Carl Mese, Cary, NC (US); Russell Speight VanBlon, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 31 days.

(21) Appl. No.: 14/959,225

(22) Filed: Dec. 4, 2015

(65) Prior Publication Data
US 2017/0164171 A1    Jun. 8, 2017

(51) Int. Cl.
*H04M 3/00* (2006.01)
*H04W 4/16* (2009.01)
(Continued)

(52) U.S. Cl.
CPC ............ *H04W 4/16* (2013.01); *G06F 1/163* (2013.01); *G06F 3/011* (2013.01); *G06F 3/0481* (2013.01);
(Continued)

(58) Field of Classification Search
CPC ........... H04M 1/7253; H04M 1/72569; H04W 84/18; H04W 4/16; H04W 24/02;
(Continued)

(56) References Cited

U.S. PATENT DOCUMENTS 8,854,925 B1 * 10/2014 Lee .................. G04G 9/0005
368/10
9,171,434 B2 10/2015 Faaborg et al.
(Continued)

FOREIGN PATENT DOCUMENTS

CN    103476024 A    12/2013
CN    204465672 U    7/2015
(Continued)

OTHER PUBLICATIONS

Baviskar Rahul Nandkishor, Mrs. Aparna Shinde, Mrs. P. Malathi, "Android Smartphone Based Body Area Network for Monitoring and Evaluation of Medical Parameters", 2014 First International Conference on Networks & Soft Computing, IEEE, Aug. 19, 2014, pp. 284-288.
(Continued)

*Primary Examiner* — Huy C Ho
(74) *Attorney, Agent, or Firm* — John M. Rogitz; John L. Rogitz

(57) ABSTRACT

In one aspect, a first device includes a processor, a wireless communication interface accessible to the processor, and storage accessible to the processor. The storage bears instructions executable by the processor to receive data through the wireless communication interface from a second device different from the first device that indicates that the second device is not in physical contact with a person. The instructions are also executable to decline to transmit at Least first information to the second device based at least in part on the data.

23 Claims, 5 Drawing Sheets

(51) Int. Cl.

| | | |
|---|---|---|
| *G06F 9/451* | (2018.01) | |
| *H04M 1/725* | (2006.01) | |
| *G06F 9/445* | (2018.01) | |
| *G06F 1/16* | (2006.01) | |
| *G06F 3/01* | (2006.01) | |
| *G06F 3/0481* | (2013.01) | |
| *G06F 3/0484* | (2013.01) | |
| *G06F 3/16* | (2006.01) | |
| *H04W 24/02* | (2009.01) | |

(52) U.S. Cl.
CPC ............ *G06F 3/0484* (2013.01); *G06F 3/167* (2013.01); *G06F 9/44505* (2013.01); *G06F 9/451* (2018.02); *H04M 1/7253* (2013.01); *H04M 1/72569* (2013.01); *H04W 24/02* (2013.01)

(58) Field of Classification Search
CPC ........ G06F 9/451; G06F 3/167; G06F 3/0484; G06F 3/0481; G06F 9/44505; G06F 1/163; G06F 3/11
USPC ........................................................ 455/418
See application file for complete search history.

(56) References Cited

U.S. PATENT DOCUMENTS

| | | |
|---|---|---|
| 9,521,545 B2 | 12/2016 | Hou et al. |
| 2014/0313867 A1* | 10/2014 | Lee .......................... G06F 1/163 368/223 |
| 2015/0062022 A1* | 3/2015 | Rabii ........................ G06T 1/20 345/173 |
| 2015/0242608 A1* | 8/2015 | Kim ....................... G06F 1/3231 726/19 |
| 2015/0262458 A1 | 9/2015 | Faaborg et al. |
| 2015/0271340 A1 | 9/2015 | Yu et al. |
| 2015/0289802 A1 | 10/2015 | Thomas et al. |
| 2015/0341901 A1* | 11/2015 | Ryu ................... H04M 1/72569 455/458 |
| 2015/0341903 A1* | 11/2015 | Jeong .................... H04W 68/02 455/458 |
| 2016/0105795 A1 | 4/2016 | Hou et al. |
| 2016/0134743 A1 | 5/2016 | Jeon et al. |
| 2016/0262694 A1* | 9/2016 | Calcano .................... A61L 2/16 |

FOREIGN PATENT DOCUMENTS

| | | |
|---|---|---|
| CN | 104935727 B | 8/2018 |
| CN | 105122182 B | 11/2018 |
| EP | 3009916 A1 | 4/2016 |
| WO | 2015034617 A1 | 3/2015 |
| WO | 2015138409 A1 | 9/2015 |
| WO | 2015178734 A1 | 11/2015 |

OTHER PUBLICATIONS

Byron Lowens, Vivian Motti, Kelly Caine, "Design Recommendations to Improve the User Interaction with Wrist Worn Devices", 2015 IEEE International Conference on Pervasive Computing and Communication Workshops, Mar. 23, 2015, pp. 562-567.

* cited by examiner

PRESENTATION OF INFORMATION BASED ON WHETHER USER IS IN PHYSICAL CONTACT WITH DEVICE

FIELD

The present application relates generally to presentation of information based on whether a user is in physical contact with a device.

BACKGROUND

Wearable devices are increasing in prevalence, and often times they are paired with another device such as a smart phone to receive information therefrom. However, when the wearable device is not being worn, information is still received and presented at the wearable device. As recognized herein, this can be problematic and frustrating to a user because the user may not be near the device and hence may not be made aware of the information.

SUMMARY

Accordingly, in one aspect a first device includes a processor, a wireless communication interface accessible to the processor, and storage accessible to the processor. The storage hears instructions executable by the processor to receive data through the wireless communication interface from a second device different from the first device that indicates that the second device is not in physical contact with a person. The instructions are also executable to decline to transmit at least first information to the second device based at least in part on the data.

In another aspect, a method includes determining whether a user is in physical contact with a wearable device, presenting first information at the wearable device based on a determination that the user is in physical contact with the wearable device, and declining to present the first information at the wearable device basal on a determination that the user is not in physical contact with the wearable device.

In still another aspect, a first device includes a processor, a contact sensor accessible to the processor, a communication interface accessible to the processor, and storage accessible to the processor. The storage bears instructions executable by the processor to receive data from a second device different from the first device via the communication interface, determine whether the first device is in contact with a person based at least in part on at least one signal from the contact sensor, and decline to provide a first notification at the first device pertaining to the data in response to a determination that the first device is not in contact with a person.

In yet another aspect, a first device includes a processor, a display accessible to the processor, a contact sensor accessible to the processor, a communication interface accessible to the processor, and storage accessible to the processor. The storage bears instructions executable by the processor to determine whether the first device is in contact with a person based at least in part on at least one signal from the contact sensor and, in response to a determination that the first device is not in contact with a person, transmit a notification to a second device different from the first device that the first device is not in contact with a person. The instructions are also executable by the processor to, in response to a determination that the first device is in contact with a person, present information on the display.

The details of present principles, both as to their structure and operation, can best be understood in reference to the accompanying drawings, in which like reference numerate refer to like parts, and in which:

DETAILED DESCRIPTION

Figure 1:
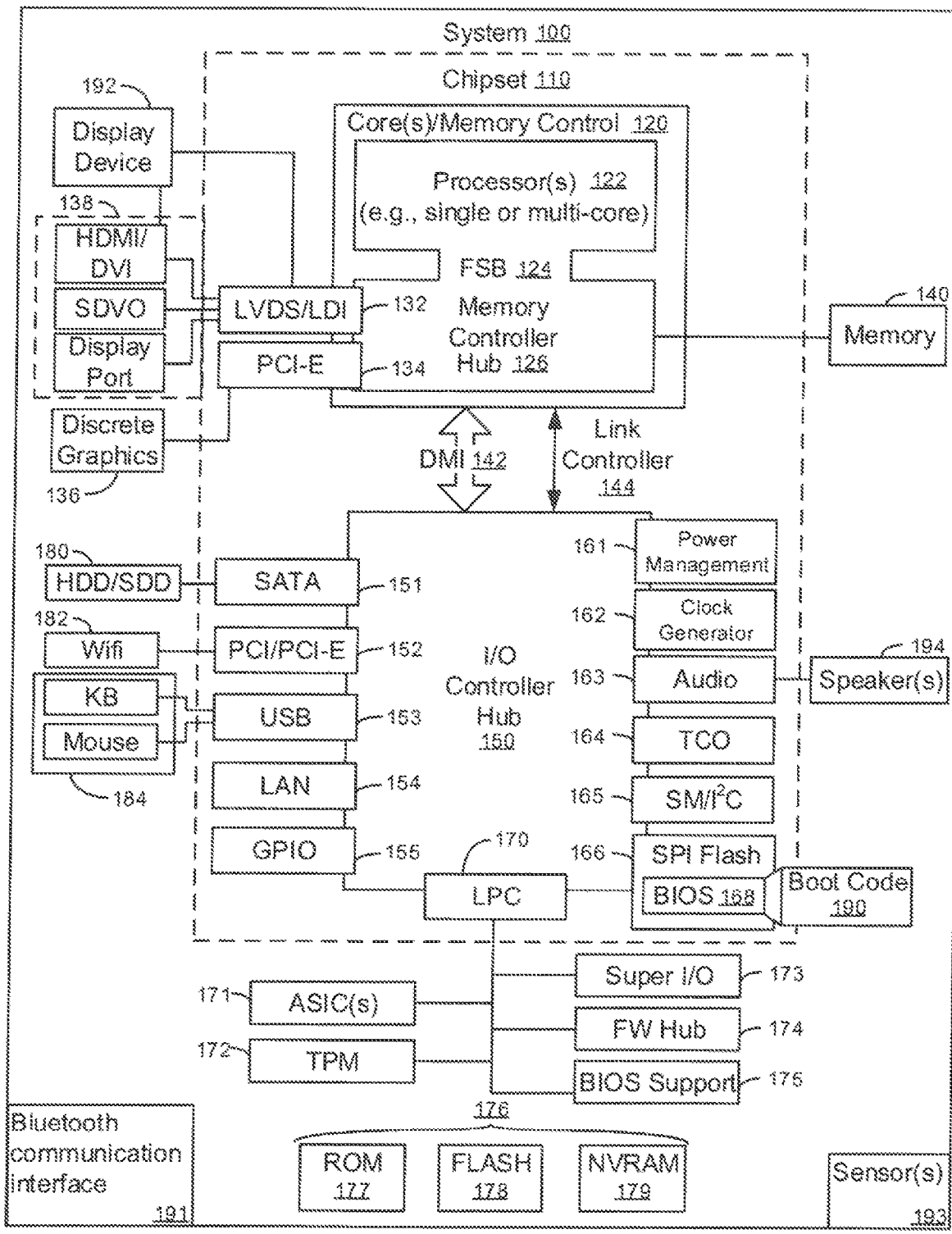
FIG. 1 is a block diagram of an example system in accordance with present principles.

With respect to any computer systems discussed herein, a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple, Google, or Microsoft. A Unix or similar such as Linux operating system may be used. These operating systems can execute one or more browsers such as a browser made by Microsoft or Google or Moziila or other browser program that can access web applications hosted by the Internet servers over a network such as the Internet, a local intranet, or a virtual private network.

As used herein, instructions refer to computer-implemented steps for processing information in the system. Instructions can be implemented in software, firmware or hardware; hence, illustrative components, blocks, modules, circuits, and steps are set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed, in addition to a general purpose processor, in or by a digital signal processor (DSP), a field programmable gale array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Any software and/or applications described by way of flow charts and/or user interfaces herein can include various sub-routines, procedures, etc. It is to be understood that logic divulged as being executed by, e.g., a module can be redistributed to other software modules and/or combined together in a single module and/or made available in a shareable library.

Logic when implemented in software, can be written in an appropriate language such as but not limited to C # or C++, and can be stored on or transmitted through a computer-readable storage medium (e.g., that may not be a transitory signal) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and twisted pair wires. Such connections may include wireless communication connections including infrared and radio.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of fee processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system, having at least one of A, B, C") includes systems that have A alone, B alone, C alone, A and B together, A and C together, B and C together, and/or A, B, and C together, etc.

"A system having one or more of A, B, and C" (likewise "a system having one or more of A, B, or C" and "a system having one or more of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc, of Morrisville, N.C.; however, as apparent from the description herein, a client device, a server or other machine in accordance with present principles may include other features or only some of the features of the system 100. Also, the system 100 may be, e.g., a game console such as XBOX® or Playstation®, and/or the system 100 may include a wireless telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled display, etc.). A block 138 includes some examples of technologies that may be supported via the LVDS interface 132 (e.g., serial digital video, HDMI/DVI display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processors) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate Independent of a PCI-E interface.

The interfaces of the I/O hub controller 150 may provide for communication with various devices, networks, etc. For example, where used, the SATA Interface 151 provides for reading, writing or reading and writing information on one or more drives 180 such as HDDs, SDDs or a combination thereof, but in any case the drives 180 are understood to be, e.g., tangible computer readable storage mediums that may not be transitory signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Still further, the system 100 may include at least one (e.g., wireless) communication interface 191 such as a Bluetooth communication interface, near field communication (NFC) interface, Wi-Fi and/or Wi-Fi direct interface, etc. The system 100 may also include at least one sensor 193 for use in accordance with present principles to sense the presence and/or physical contact of a person at least in proximity to, if not physically touching, the system 100. The sensor 193 may be an optical sensor, a touch sensor (e.g., capacitive-based touch sensor), a heat and/or thermal sensor, a heart rate sensor, a blood pressure sensor, a perspiration sensor, another type of biometric sensor, etc.

Additionally, though now shown for clarity, in some embodiments the system 100 may include a gyroscope that senses and/or measures the orientation of the system 100 and provides input related thereto to the processor 122, an accelerometer that senses acceleration and/or movement of the system 100 and provides input related thereto to the processor 122, an audio receiver/microphone that provides input to the processor 122 based on, e.g., a user providing audible input to the microphone, and a camera that gathers one or more images and provides input related thereto to the processor 122. The camera may be a thermal imaging camera, a digital camera such as a webcam, a three-dimensional. (3D) camera, and/or a camera otherwise integrated into the system 100 and controllable by the processor 122 to gather pictures/images and/or video. Still further, and also not shown for clarity, the system 100 may include a GPS transceiver that is configured to receive geographic position information from at least one satellite and provide the information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
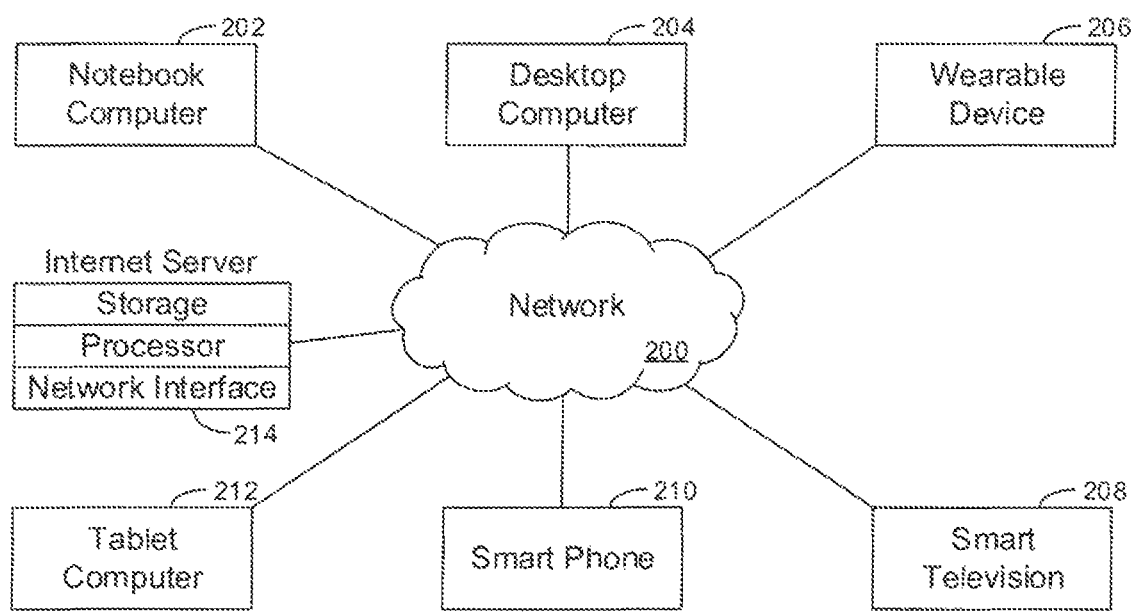
FIG. 2 is a block diagram of a network of devices in accordance with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, and a server 214 such as an Internet server that may provide cloud storage accessible to the devices 202-212. It is to be understood that the devices 202-214 are configured to communicate with each other over the network 200 to undertake present principles.

Figure 3:
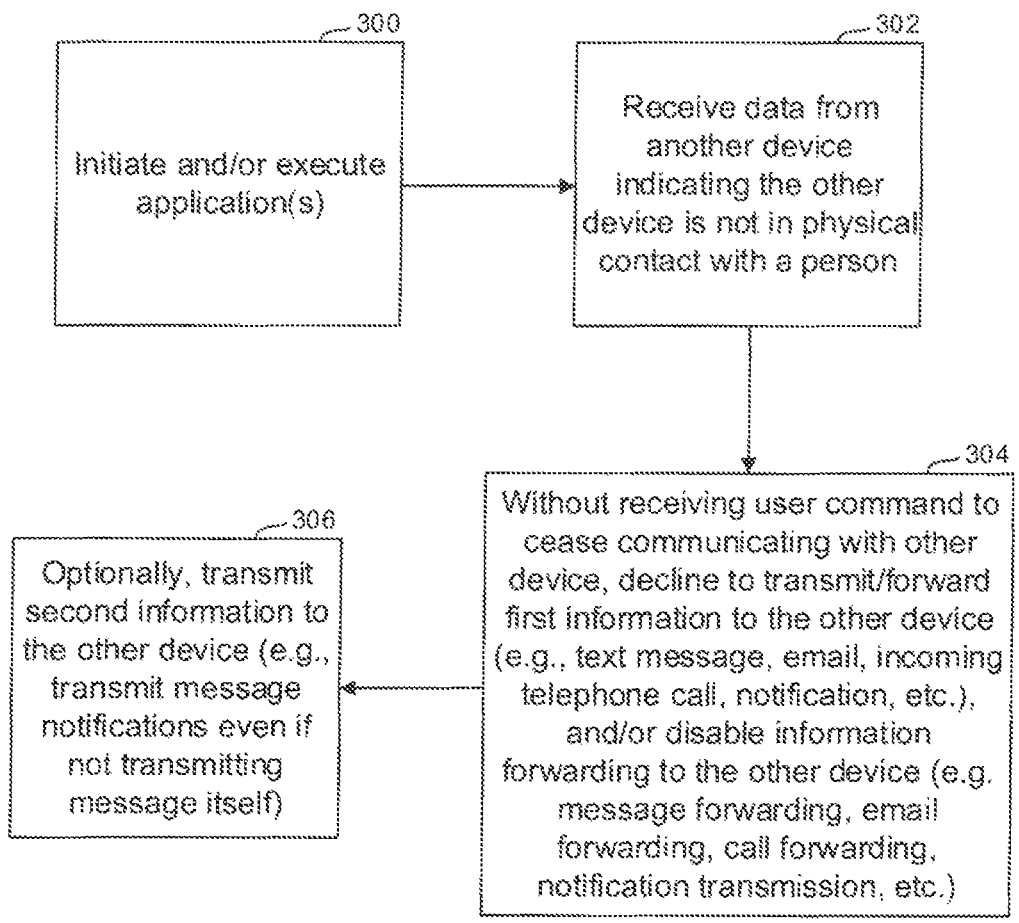
FIGS. 3 and 4 are flow charts showing example algorithms in accordance with present principles.

Referring to FIG. 3, it shows example logic that may be undertaken by a device, such as the system 100, which communicates with a wearable device (e.g., a smart watch) in accordance with present principles. The device executing the logic of FIG. 3 will be referred to as a "smart phone" for simplicity, but it is to be understood that other types of devices may also execute the logic of FIG. 3, such as a tablet computer, a laptop computer, another wearable device, etc.

In any case, the logic of FIG. 3 begins at block 300, where the logic initiates and/or executes one or more applications for undertaking present principles, such as a text messaging application, a telephone application, an email application, a wireless communication application, a device pairing application, etc. Also at block 300, the logic may establish communication with a wearable device, which will be referred to as a "smart watch" in reference to FIG. 3 for simplicity.

After block 300, the logic proceeds to block 302 where the logic receives data from the smart watch (via the smart phone's communication interlace) that indicates that the smart watch is currently not in contact with a person, such as not physically touching and/or in contact with a portion of the person's body such as the user's wrist. Responsive to receipt of the data at block 302, the logic proceeds to block 304.

At block 304 the logic may decline to transmit and/or forward to the smart watch first information/notifications, such as a text message, an incoming telephone call, an email, and/or an indication about a message (e.g., about a new and/or unread text message) or telephone call. In addition to or in lieu of the foregoing, but also at block 304, the logic may disable information/notification forwarding to the smart watch such that (e.g., all types of) information/notifications stored at and/or received at the smart phone are not forwarded to the smart watch for presentation at the smart watch. For instance, text message forwarding may be disabled, as may be email forwarding, telephone call forwarding, notification forwarding and/or transmission of notifications pertaining to information received at the smart phone, etc.

However, whether declining to forward the first information or disabling information forwarding, or both, the logic may do so at block 304 by determining to not execute instructions stored at the smart phone that would otherwise be executed for the smart phone to transmit such information to the smart watch with which the smart phone is communicating (e.g., paired). Furthermore, in some embodiments while declining to forward the first information and/or disabling information forwarding, the smart watch may also present the information at the smart phone instead, and/or continue to indicate that the information (such as a recently received text message) has not been read and/or is new information.

Still further, also note that the logic may perform the operations described above (e.g., in reference to FIG. 3 and/or to block 304) without receiving a user command at the smart phone to cease communicating with the smart watch, to un-pair with the smart watch, etc. Thus, in some embodiments, the smart phone and smart watch may still be engaged in and/or able to communicate with each other even if information/notifications such as text messages and incoming telephone calls are not forwarded to the smart watch as described herein.

Still in reference to FIG. 3, from block 304 the logic may proceed to block 306, where the logic may, in some embodiments, transmit second information to the smart watch even if not transmitting the first information. For instance, the logic may decline to transmit a text message received at the smart phone but still transmit a notification to the smart watch that a new text message has been received and/or is available for viewing.

Figure 4:
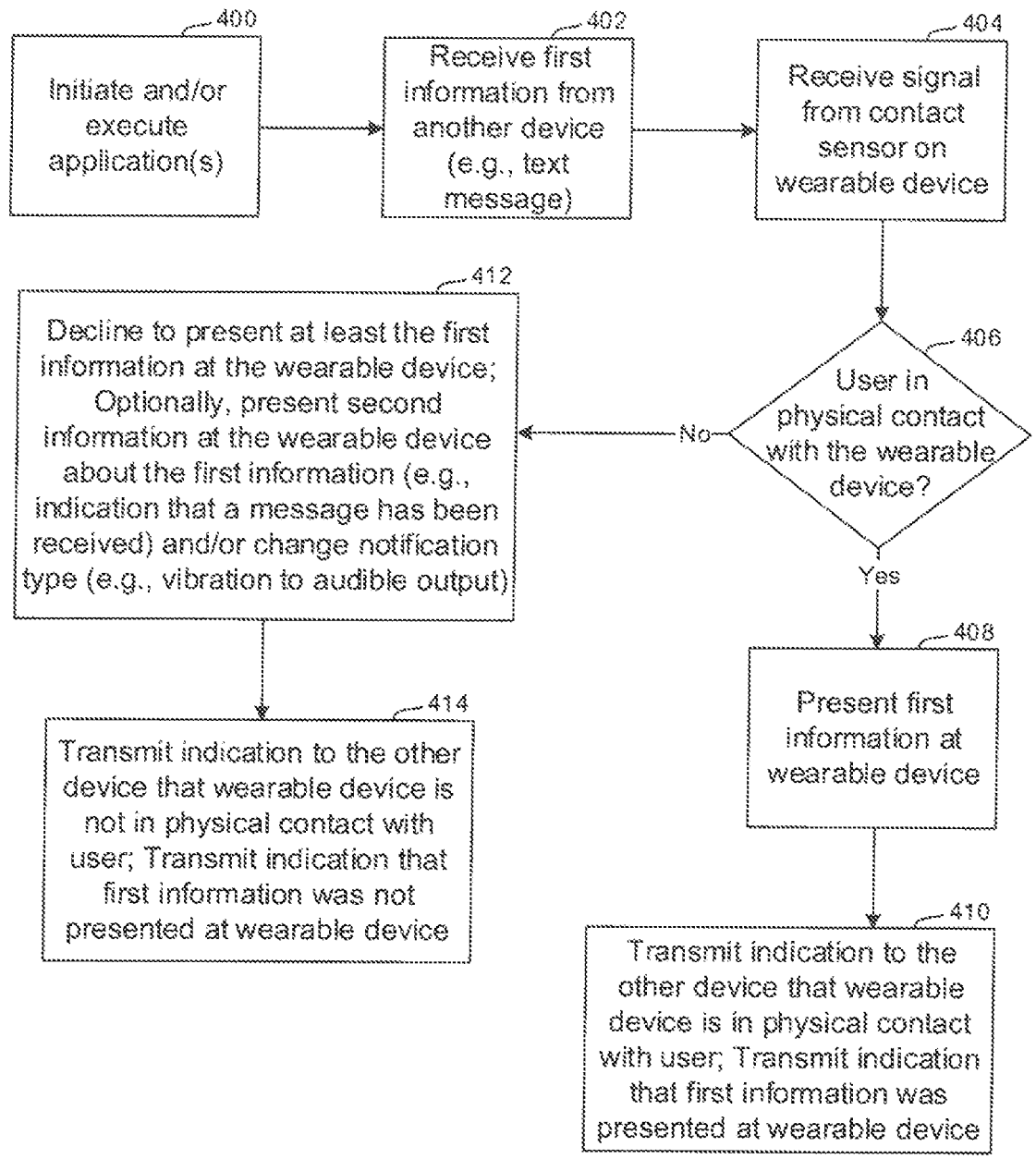

Moving on, reference is now made to FIG. 4, which shows example logic that may be undertaken by a device, such as the system 100 and/or a wearable device, which communicates with another device such as a smart phone in accordance with present principles. Thus, the other device with which the device executing the logic of FIG. 4 communicates with will be referred to in reference to FIG. 4 as a "smart phone" for simplicity. Furthermore, the device executing the logic of FIG. 4 will be referred to as a "smart watch" for simplicity, but it is to be understood that other types of devices may also execute the logic of FIG. 4, such as another type of wearable device and/or a device confirmed to be physically engaged with and/or coupled to a person.

The logic of FIG. 4 begins at block 400, where the logic initiates and/or executes one or more applications for undertaking present principles, such as a text messaging application, a telephone application, an email application, a wireless communication application, a device pairing application, an information presentation application, etc. Also at block 400, the logic may establish communication with the smart phone, such as responsive to the smart watch detecting that it has undergone movement (e.g., based on signals from an accelerometer in the smart watch).

After block 400, the logic proceeds to block 402 where the logic receives first information (through its communication interface) from the smart phone, such as a text message, text message indication, email, email indication, incoming telephone call, income telephone call indication, etc. The logic then proceeds to block 404 where the logic receives at least one signal from a contact sensor on the smart watch. Then at decision diamond 406 the logic determines, based on the signal that is received at block 404, whether the user is in physical contact with and/or physically touching the smart watch. For instance, the signal(s) may contain data identifiable by the smart watch as being indicative of the device not being in physical contact with the user, or may contain data identifiable by the smart watch as being indicative of the device being in physical contact with the user.

E.g., if the sensor is a heart rate sensor, a signal received from the sensor that no heart rate is detected may be identified by the smart watch as being indicative of the device not being in physical contact with the user, whereas a signal received from the sensor that a heart rate is detected, and/or a signal indicating a particular heart rate, may be identified by the smart watch as being indicative of the device being in physical contact with the user. As another example, if the sensor is a heat sensor, a signal received from the sensor that temperature below a temperature threshold is detected may be identified by the smart watch as being indicative of the device not being in physical contact with the user, whereas a signal received from the sensor that a temperature above the temperature threshold is detected may be identified by the smart watch as being indicative of the device being in physical contact with the user. As but one more example, if the sensor is a touch and/or contact sensor, a signal received from the sensor that no contact with the sensor/smart watch is detected may be identified by the smart watch as being indicative of the device not being in physical contact with the user, whereas a signal received from the sensor that contact with the sensor is detected may be identified by the smart watch as being indicative of the device being in physical contact with the user.

Still in reference to diamond 406, note that an affirmative determination at diamond 406 causes the logic to proceed to block 408. At block 408 the logic presents the first Information received at block 402 at the smart watch. The first information may be presented on a display of the smart watch, using a vibration or series of vibrations from a vibration producing mechanism on the smart watch, and/or audibly using a speaker on the smart watch. From block 408 the logic then proceeds to block 410, where the logic transmits an indication, using the smart watch's communication interface, to the smart phone that the smart watch is in physical contact with a person. Also at block 410, the logic may transmit to the smart phone an indication that the first information is and/or was presented at the smart watch so that, for example, the smart phone can mark and/or indicate the first information, as stored at the smart phone, as being viewed and/or observed even though presented at the smart watch rather than smart phone.

Referring back to diamond 406 again, note that if a negative determination is made at diamond 406, the logic instead proceeds to block 412. At block 412 the logic declines to present at least the first information at the smart watch, such as by declining to execute instructions stored at the smart watch that would otherwise be executed, for the smart watch to present the first information at the smart watch. Also at block 412, the logic may, in some embodiments and/or if presentation of information has not been disabled altogether based on a person not being in physical contact with the smart watch as may sometimes be the case, present second information different from the first information at the smart watch. The second information may pertain to the first information. For instance, the second information may be an indication and/or notification that a new text message has been received, where the new text message itself is the first information.

Also in some embodiments at block 412, the logic may, responsive to declining to present the first information and/or responsive to determining that a person is not in physical contact with the smart watch, change a notification type for notifications that are to be provided at the smart watch. For instance, responsive to determining that a person is not in physical contact with the smart watch, at block 412 the logic may present the second information (e.g., a notification of a new text message) as audible output (e.g., a particular tone, sound, and/or computerized voice output through the smart watch's speaker) rather than as a vibration by actuating a speaker on the smart watch to present the audible output, where the vibration notification type may otherwise be used to produce vibrations at the smart watch corresponding to the second information responsive to determining that a person is in fact in physical contact with the smart watch.

After block 412 the logic proceeds to block 414. At block 414 the logic transmits an indication, using the smart watch's communication interface, to the smart phone that the smart watch is not in physical contact with a person. Also at block 414, the logic may transmit to the smart phone an indication that the first information is not and/or was not presented at the smart watch so that, for example, the smart phone can mark and/or indicate the first information, as stored at the smart phone, as being unviewed and/or not observed (e.g., at the smart, watch or elsewhere).

Note that the logic may perform the operations described above (e.g., in reference to FIG. 4 and/or to block 412) without receiving a user command at the smart watch to cease communicating with the smart phone, to un-pair with the smart phone, etc. Thus, in some embodiments, the smart watch and smart phone may still be engaged in and/or able to communicate with each other even if information such as text messages and incoming telephone calls is not presented at the smart watch as described herein.

Figure 5:
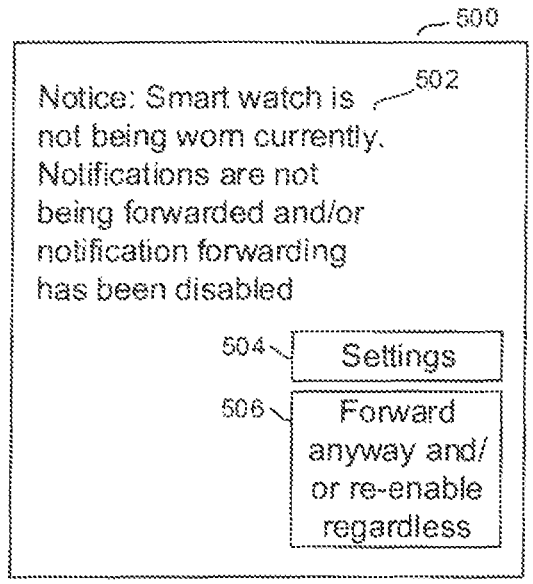
FIGS. 5-8 show example user interfaces (UIs) in accordance with present principles.
Figure 6:
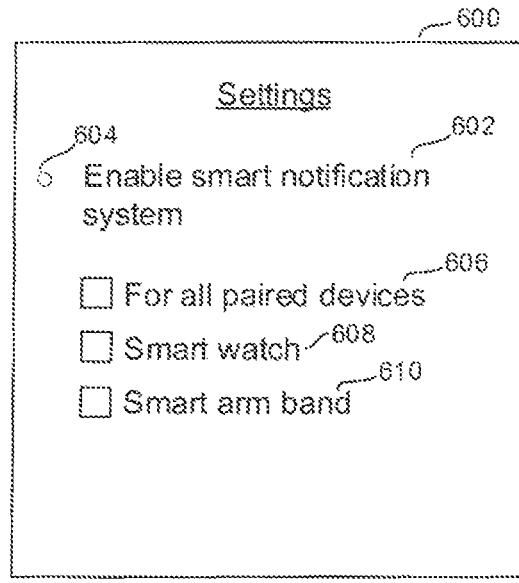

Furthermore, before describing FIGS. 5 and 6, it is to be understood that in some embodiments, the smart watch of FIG. 4 may not, e.g., execute the steps described at blocks 402, 408, and 412, but may still transmit an indication to the smart phone regarding whether the smart watch is in physical contact with a person (e.g., for embodiments where the smart phone determines whether to decline to forward information and/or disable message forwarding).

Continuing the detailed description in reference to FIGS. 5 and 6, user interfaces (UIs) presentable on a display of a device undertaking present principles, such as a device that communicates with a wearable device, are shown. Thus, for example, the UIs of FIGS. 5 and 6 may be presented on the smart phone described above in reference to FIG. 3.

Beginning first with the description of FIG. 5, a UI 500 is shown. The UI 500 includes an indication 502 that a wearable device with which the device presenting the UI 500 (referred to in reference to FIG. 5 as a "smart phone" for simplicity) is communicating is not being worn and/or is not in physical contact with a person. The indication 502 may also convey that information such as notifications are not being forwarded to the smart watch, and/or convey that information forwarding to the smart watch has been disabled.

The UI 500 also includes a settings selector 504 which is selectable by a user (e.g., using touch-based input) to automatically without further user input cause a UI for configuring settings in accordance with present principles to be presented, such the UI 600 of FIG. 6 that will be described shortly. However, before doing so, also note that the UI 500 includes a selector 506 selectable to automatically without further user input cause the smart phone to forward the information to the smart watch despite the smart watch not being in physical contact with a person, and/or to re-enable information forwarding despite the smart watch not being in physical contact with a person.

Now in reference to the example settings UI 600 shown in FIG. 6, the UI 600 includes at least a first option 602 to enable a device in accordance with present principles to execute the logic described in reference to FIG. 3, and/or to otherwise undertake present principles (e.g., either transmit/forward first information at a smart watch or decline to do so based on whether a user is in physical contact with the smart watch). The option 602 is enableable responsive to selection of the radio button 604, where deselection of the radio button 604 disables the option 602.

The UI 600 also includes one or more sub-options 606, 608, and 610 for the option 602, with each sub-option being respectively enableable responsive to selection of the respective check boxes shown next to each one and respectively disableable responsive to deselection of the respective check boxes shown. The first sub-option 606, if enabled, enables the device presenting the UI 600 to undertake present principles for all devices paired with and/or otherwise communicating with (and/or configured to communicate with) the device presenting the UI 600. The sub-options 608 and 610, if enabled, enable the device presenting the UI 600 to undertake present principles for respective specific devices paired with and/or otherwise communicating with the device presenting the UI 600, such as a smart watch and a smart arm band.

Figure 7:
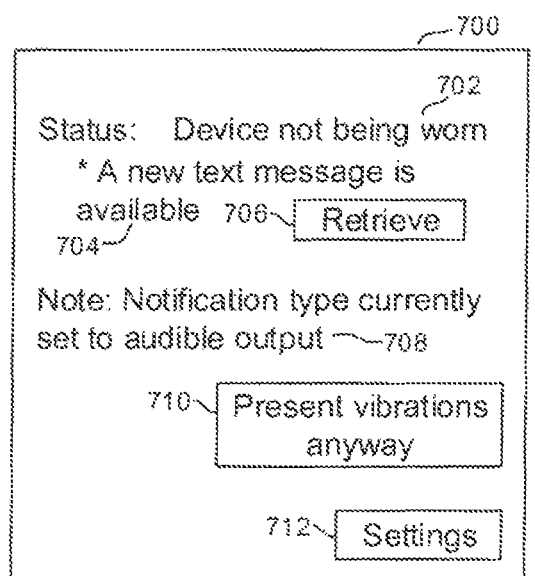
Figure 8:
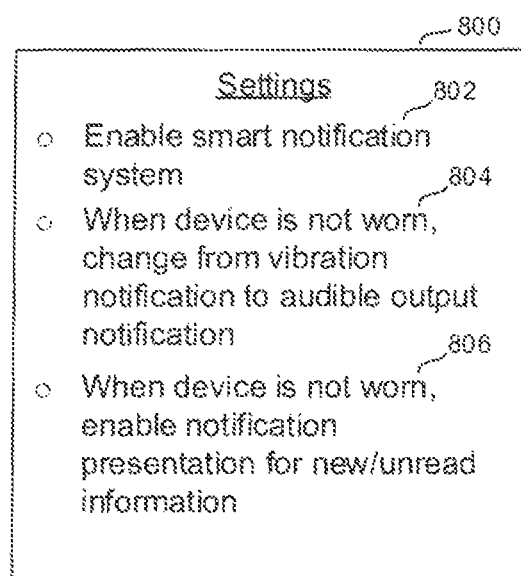

Continuing the detailed description in reference to FIGS. 7 and 8, user interfaces (UIs) presentable on a display of a device undertaking present principles, such as a wearable device that communicates with another device, are shown. Thus, for example, the UIs of FIGS. 7 and 8 may be presented on the smart watch described above in reference to FIG. 4.

Beginning first with the description of FIG. 7, a UI 700 is shown. The UI 700 includes an indication 702 that the device (e.g., a wearable device) presenting the UI 700 (referred to in reference to FIG. 7 as a "smart watch" for simplicity) is not being worn and/or is not in physical contact with a person. The UI 700 also includes an indication 704 that new, unobserved, and/or recently received information is available for presentation at the smart watch. A selector 706 is presented that is selectable to automatically without further user input one or more of: present the information if already received at the smart watch, and/or retrieve the information by requesting it from the device with which the smart watch is communicating and then receiving and presenting it at the smart watch (such as if the information itself was not initially received from the other device but a notification pertaining to the information was received).

Still further, the UI 700 may include an indication 708 that the notification type for providing notifications at the smart watch is currently set to audible output to thus provide notifications such as the indication 704 audibly. However, also note that a selector 710 is presented that is selectable to automatically without further user input set the notification type for providing notifications at the smart watch to vibration notifications (e.g., despite the feet that the smart watch is not being currently worn). Even further, note that the UI 700 includes a selector 712 which is selectable to automatically without further user input cause a UI for configuring settings in accordance with present principles to be presented, such the UI 800 of FIG. 8 that will be described next.

Thus, reference is now made to the example settings UI 800 shown in FIG. 8. The UI 800 includes at least a first option 802 to enable a device in accordance with present principles to execute the logic described in reference to FIG. 4, and/or to otherwise undertake present principles (e.g., either present first information at a smart watch or decline to do so based on whether a user is in physical contact with, the smart watch). The option 802 is enableable responsive to selection of the radio button shown adjacent thereto, where deselection of this radio button disables the option 802.

The UI 800 also includes an option 804 enableable responsive to selection of the radio button shown adjacent thereto to change vibration types for information to be presented at the wearable device based on whether the wearable device is in contact with a person, such as by presenting vibration notifications while the wearable device is in contact with a person and presenting audible output notifications while the wearable device is not in contact with a person.

Still further, the UI 800 includes an option 806 enableable responsive to selection of the radio button shown adjacent thereto to enable some information (e.g., a notification) to be presented at the wearable device while the wearable device is not in contact with a person, where that information pertains to other information (e.g., a text message) that will not be presented while the wearable device is distanced from a person. Lastly, note that both the options 804 and 806 are disableable responsive to deselection of each one's respective radio button.

Before concluding, it is to be understood that although a software application for undertaking present principles may be vended with a device such as the system 100, present principles apply in instances where such an application is downloaded from a server to a device over a network such as the Internet. Furthermore, present principles apply in instances where such an application is included on a computer readable storage medium that is being vended and/or provided, where the computer readable storage medium is not a transitory signal and/or a signal per se.

While the particular PRESENTATION OF INFORMATION BASED ON WHETHER USER IS IN PHYSICAL CONTACT WITH DEVICE is herein shown and described in detail, it is to be understood that the subject matter which is encompassed by the present application is limited only by the claims.

What is claimed is:

1. A first device, comprising:
  at least one processor;
  at least one display;
  at least one wireless communication interface accessible to the at least one processor; and
  storage accessible to the at least one processor and bearing instructions executable by the at least one processor to:
  responsive to a determination that the first device is in physical contact with a user, receive a message from a second device different from the first device and present the message on the at least one display, wherein the first device is a wearable device; and
  responsive to a determination that the first device is not in physical contact with the user, present an audible notification at the first device regarding the message, the audible notification presented using a computerized voice, the notification being different from the message itself.

2. The first device of claim 1, wherein the message is received at the first device based on the message being forwarded to the first device from the second device.

3. The first device of claim 1, comprising at least one speaker accessible to the at least one processor, wherein the audible notification is presented via the at least one speaker.

4. The first device of claim 1, wherein the instructions are executable to:
  present, on the at least one display, a graphical user interface (GUI), the GUI comprising an option that is selectable a single time to enable a setting of the first device for the first device to, in the future and responsive to the setting being enabled, perform plural future determinations regarding whether the first device is in contact with the user.

5. The first device of claim 1, wherein the message is a text message, and wherein the instructions are executable to:
  responsive to a determination that the first device is not in physical contact with the user, present, on the at least one display, a graphical user interface (GUI), the GUI comprising text indicating that the first device is not in physical contact with the user, the GUI further comprising text indicating that the text message is new and available, the GUI further comprising a selector that is selectable to retrieve the text message from the second device and present the text message on the at least one display of the first device.

6. The first device of claim 5, wherein the GUI is a first GUI, wherein the selector is a first selector, and wherein the first GUI further comprises a second selector different from the first selector, the second selector being selectable to command the first device to present a second GUI different from the first GUI at the first device, the second GUI indicating one or more settings of the first device related to presentation of messages at the first device.

7. The first device of claim 1, wherein the instructions are executable to:
  present, on the at least one display, a graphical user interface (GUI) that comprises an option selectable by a user to provide a command to the second device to switch notification types for notifications that will be presented at the second device based on identification of the second device as not being in contact with the user.

8. A method, comprising:
  responsive to determining that a first device is in physical contact with a user, receiving a message from a second device different from the first device and presenting the message on an electronic display of the first device, wherein the first device is a wearable device; and
  responsive to determining that the first device is not in physical contact with the user, presenting an audible notification at the first device regarding the message, the audible notification presented using a computerized voice, the notification being different from the message itself.

9. The method of claim 8, wherein the method comprises:
  based on a determination that the user is not in physical contact with the first device, declining to forward the message to the first device but transmitting information regarding the audible notification to the first device.

10. The method of claim 8, comprising:
  presenting, on the electronic display, a graphical user interface (GUI), the GUI comprising an option that is selectable a single time to enable a setting of the first device for the first device to, in the future and responsive to the setting being enabled, perform plural future determinations regarding whether the first device is in contact with a person.

11. The method of claim 8, comprising:
  responsive to determining that the first device is not in physical contact with the user, presenting, on the electronic display, a graphical user interface (GUI), the GUI comprising text indicating that the first device is not in physical contact with the user, the GUI further comprising text indicating that the message is new and available, the GUI further comprising a selector that is selectable to retrieve the message from the second device and present the message on electronic display of the first device.

12. A first device, comprising:
  at least one processor;
  at least one display accessible to the at least one processor;

at least one contact sensor accessible to the at least one processor;

at least one communication interface accessible to the at least one processor; and storage accessible to the at least one processor and bearing instructions executable by the at least one processor to:

present, on the at least one display, a graphical user interface (GUI) that comprises an option selectable by a user to switch notification types for notifications presented at the first device based on identification of the first device as not being in contact with a person;

identify whether the first device is in contact with a person based at least in part on at least one signal from the contact sensor;

based on an identification that the first device is not in contact with a person, present a first notification at the first device of a first notification type, the first notification type being used based on selection of the option from the GUI; and based on an identification that the first device is in contact with a person, present a second notification at the first device of a second notification type, the second notification type being different from the first notification type;

wherein the first notification type is an audio notification type; and wherein the first notification is presented in a computerized voice.

13. The first device of claim 12, wherein the GUI is a first GUI, and wherein the instructions are executable by the at least one processor to:

based on an identification that the first device is not in contact with a person, present a second GUI on the display, the second GUI comprising a selector that is selectable to retrieve information from a second device and to present the information via the first device, the second GUI being different from the first GUI.

14. The first device of claim 12, wherein the second notification type is a vibration notification type.

15. The first device of claim 12, wherein first device comprises at least one speaker for outputting the first notification via the at least one speaker.

16. The first device of claim 15, wherein the instructions are executable by the at least one processor to:

present the first notification via the at least one speaker.

17. The first device of claim 12, wherein the option, based on selection by a user, switches notification types from a vibration notification to an audio notification for notifications provided based on identification of the first device as not being in contact with a person.

18. The first device of claim 12, wherein the option is a first option, and wherein the GUI comprises a second option that is selectable a single time to enable a setting of the first device for the first device to, in the future and responsive to the setting being enabled, perform plural future identifications regarding whether the first device is in contact with a person.

19. A method, comprising:

presenting, on an electronic display of a first device, a graphical user interface (GUI) that comprises an option selectable by a user to select a first notification type for notifications presented at the first device based on identifying the first device as not being in contact with a person;

identifying whether the first device is in contact with a person based at least in part on at least one signal from a contact sensor;

based on identifying that the first device is not in contact with a person, presenting a first notification at the first device of the first notification type, the first notification type being used based on selection of the option from the GUI; and based on identifying that the first device is in contact with a person, presenting a second notification at the first device of a second notification type, the second notification type being different from the first notification type;

wherein the first notification is presented in a computerized voice.

20. The method of claim 19, wherein the GUI is a first GUI, and wherein the method comprises:

based on identifying that the first device is not in contact with a person, presenting a second GUI on the electronic display, the second GUI comprising a selector that is selectable to retrieve information from a second device and to present the information via the first device, the second GUI being different from the first GUI.

21. The method of claim 19, wherein the first notification type is an audio notification type and wherein the second notification type is a vibration notification type.

22. The method of claim 19, wherein the option, based on selection by a user, switches notification types from a vibration notification to an audio notification for notifications provided based on identification of the first device as not being in contact with a person.

23. The method of claim 19, wherein the option is a first option, and wherein the GUI comprises a second option that is selectable a single time to enable a setting of the first device for the first device to, in the future and responsive to the setting being enabled, perform plural future identifications regarding whether the first device is in contact with a person, the second option being different from the first option.

* * * * *